US012679669B2

(12) United States Patent
Okumura et al.

(10) Patent No.: US 12,679,669 B2
(45) Date of Patent: Jul. 14, 2026

(54) CONTROL METHOD AND CONTROL DEVICE FOR ROBOT

(71) Applicant: NIDEC INSTRUMENTS CORPORATION, Nagano (JP)

(72) Inventors: Hirokatsu Okumura, Nagano (JP); Takahiro Shiraki, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 480 days.

(21) Appl. No.: 18/460,612

(22) Filed: Sep. 4, 2023

(65) Prior Publication Data

US 2024/0092590 A1      Mar. 21, 2024

(30) Foreign Application Priority Data

Sep. 15, 2022    (JP) ................................. 2022-146956

(51) Int. Cl.
B65G 47/90          (2006.01)
(52) U.S. Cl.
CPC .................................. B65G 47/905 (2013.01)
(58) Field of Classification Search
CPC ........ B65G 47/905; G05B 2219/40367; G05B 2219/40301
See application file for complete search history.

(56) References Cited

U.S. PATENT DOCUMENTS

| | | | |
|---|---|---|---|
| 6,037,733 | A | 3/2000 | Genov et al. |
| 6,643,563 | B2 | 11/2003 | Hosek et al. |
| 8,371,795 | B2 | 2/2013 | Kitahara et al. |
| 2018/0297202 | A1 * | 10/2018 | Nishitani ................ G06F 30/20 |
| 2019/0135556 | A1 * | 5/2019 | Inomata ............... B65G 47/905 |
| 2021/0229266 | A1 * | 7/2021 | Shibata .................... B25J 9/108 |
| 2025/0196337 | A1 * | 6/2025 | Okamoto ................. B25J 9/044 |

FOREIGN PATENT DOCUMENTS

| | | |
|---|---|---|
| JP | 2000506789 | 6/2000 |
| JP | 4364634 | 11/2009 |
| JP | 4750231 | 8/2011 |
| JP | 5199117 | 5/2013 |

* cited by examiner

*Primary Examiner* — Nhi Q Bui
(74) *Attorney, Agent, or Firm* — JCIPRNET

(57)          ABSTRACT

When first arm is connected to a base at a joint point J0, a second arm is connected to the first arm at a joint point J1, a third arm is connected to the second arm at a joint point J2, a hand is connected to the third arm at a joint point J3, a target position of the joint point J3 is designated, and a robot is moved, the joint point J2 is set on a virtual travel axis passing through the joint point J0, an angle formed by a reference direction (X-axis) and the virtual travel axis is defined as a virtual travel axis angle, and respective motors of axes are driven using the virtual travel axis angle and the target position.

19 Claims, 9 Drawing Sheets

TW = 0°

TW = 25°

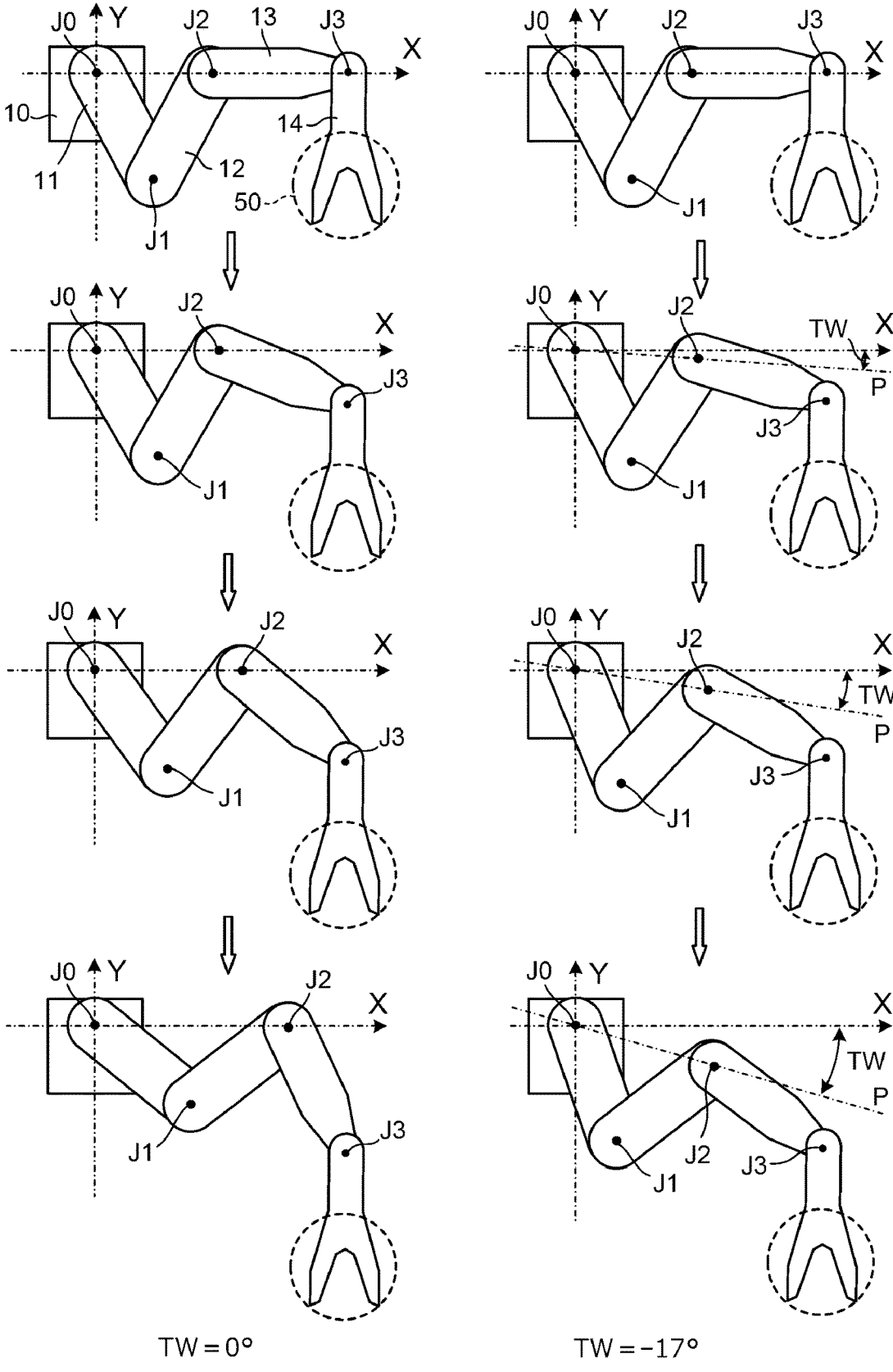
TW = 0°                    TW = −17°
FIG. 8A                    FIG. 8B

CONTROL METHOD AND CONTROL DEVICE FOR ROBOT

CROSS REFERENCE TO RELATED APPLICATION

This application claims the benefit of Japanese Application No. 2022-146956, filed on Sep. 15, 2022. The entirety of the above-mentioned patent application is hereby incorporated by reference herein and made a part of this specification.

BACKGROUND

Field of the Invention

At least an embodiment of the present invention relates to a control method and a control device for a horizontal articulated robot used in workpiece transport or the like.

Description of the Related Documents

A transport robot is used in order to transport a workpiece such as a semiconductor wafer between a cassette for storing a workpiece and a workpiece processing device for processing a workpiece. In the following description, an object from which a workpiece is taken out (i.e., loaded) and from which the workpiece is unloaded (i.e., unloaded) by a robot is collectively referred to as a stage. A cassette used in storage of wafers in a semiconductor manufacturing process and a workpiece processing device that performs some processes on the wafers are respective stages. In the semiconductor manufacturing process, a transport robot is disposed in a work area defined by a wall surface, a plurality of stages are arranged on the wall surface surrounding the work area, and a semiconductor wafer as a workpiece is transported between the stages by the robot. The transport robot is required to be able to load/unload a workpiece onto/from a plurality of stages. Therefore, as the robot, a horizontal articulated robot configured such that a plurality of arms are rotatably connected to each other, and rotational force of a motor and the like is transmitted to the arms to perform operation such as expansion and contraction is used. A hand on which a workpiece is actually mounted at the time of transport is rotatably attached to a most distal end arm.

Patent Document 1 discloses an example of a horizontal articulated robot used to transport a workpiece in an elongated rectangular work area. The robot disclosed in Patent Document 1 includes a hand that holds a workpiece, an arm portion that rotatably holds the hand, and a link mechanism that rotatably holds an arm joint portion on the proximal end side of the arm and causes a movement trajectory of the arm joint portion to be substantially parallel to the longitudinal direction of the work area. The link mechanism has a structure in which a base side link rotatably held by a base of the robot and an arm side link located on the arm side are connected by a link joint portion. When the robot loads/unloads a workpiece, the robot is controlled such that the hand is positioned at a position facing a stage on which the workpiece is to be loaded/unloaded in the work area, and then the hand enters the stage straight.

In the robot described in Patent Document 1, assuming that a fixed position of the workpiece is determined for each stage, a state in which the hand enters the stage in order to load or unload the workpiece and a mounting position of the workpiece in the hand coincides with the fixed position of the workpiece in the stage can be said that the robot is at the stage position. In addition, a position at which the hand takes a posture facing the stage in order to access the stage in the work area is referred to as a standby position of the stage. At the stage position, the hand is located inside the stage, but the arm is located outside the stage. At the standby position, the hand and the workpiece mounted on the hand are located outside the stage. When the stage position and the standby position are determined as described above, the robot described in Patent Document 1 can be moved by point-to-point (PTP) operation in a section from a standby position of a first stage to a standby position of a second stage. The PTP operation is operation of moving a robot by designating only a start point position and an end point position of a distal end of a tool or a hand of the robot, and the robot is caused to reach target coordinates by simultaneously driving each axis of the robot. In this case, the motor of each axis of the robot can be operated at the maximum velocity in the specification, and therefore it is possible to reach the target coordinates in a short time, but where the path of the robot specifically passes is not designated. In a case of a multi-axis robot, the motor of each axis rotates by a movement amount assigned to the axis. For each stage, the robot moves between the standby position and the stage position by linear interpolation operation in which the hand is guaranteed to move along a straight line. In this case, when an appropriate operation switching point between the standby position and the stage position is set, the robot can be moved between the standby position and the operation switching point by the PTP operation without causing the hand or the workpiece to interfere with a side wall of the stage or the like, and the section in which the robot is moved by the linear interpolation operation can be limited to the section between the operation switching point and the stage position.

In the robot described in Patent Document 1, the direction in which the hand extends is normally the direction orthogonal to the movement trajectory of the arm joint portion by the link mechanism, and therefore the degree of freedom is two except for the degree of freedom in the height direction (elevation direction), and the posture of the robot at the standby position is uniquely determined for each stage. However, in this robot, due to a restriction of a rotatable angle range for each axis, an inaccessible area, that is, a dead area may be generated in the work area, or a movement path between the stages may be complicated in order to avoid interference with a wall surface surrounding the work area. In order to solve such a problem, it is considered to increase the degree of freedom of the robot by one, and in the case of the horizontal articulated robot disclosed in Patent Document 1 (JP5199117B), it is considered to increase the degree of freedom by one by arbitrarily changing the angle between the base side link and the arm side link by the motor instead of use of the link mechanism. Examples of a horizontal articulated robot with increased degrees of freedom are described in Patent Documents 2 (JP2000506789A), 3 (JP4750231B) and 4 (JP4364634B).

In the horizontal articulated robot disclosed in Patent Document 1, when the orientation of the hand on which a workpiece is mounted is determined, the degree of freedom of the robot in a horizontal plane is 2, and the angle of each axis of the robot is uniquely determined in accordance with the position of the robot. However, in a case where the number of independently controllable arms is increased to increase the degree of freedom of the robot as described in Patent Documents 2 to 4, when the position of the robot is given, the posture (that is, the angle of each axis) of the robot for realizing the position is not uniquely determined. In such a situation, when the robot is moved by designating the start point position and the target position (end point position), a large difference may occur in the movement time depending on the posture of the robot at the target position, or the arm of the robot may interfere with a surrounding object (for example, a wall surface of the work area) during the movement. A problem of obtaining an optimum posture at a target position by giving a start point position, a posture at the start point position, and the target position is a nonlinear optimization problem, and a large amount of calculation is required in order to obtain an exact solution.

An embodiment of the present invention is to provide a control method and a control device for controlling a horizontal articulated robot having a redundant degree of freedom, the control method and the control device being capable of moving the robot to a designated target position in a short time with a small amount of calculation.

SUMMARY

A control method according to an aspect of at least an embodiment of the present invention is a control method to control a horizontal articulated robot that transports a workpiece between a plurality of stages, the robot comprising a base, a first arm rotatably connected to the base, a second arm rotatably connected to the first arm, a third arm rotatably connected to the second arm, and a hand rotatably connected the third arm and holding the workpiece, the control method including a driving step to define, as an origin, a position at which the first arm is connected to the base, to define, as a first joint point, a position at which the second arm is connected to the first arm, to define, as a second joint point, a position at which the third arm is connected to the second arm, to define, as a third joint point, a position at which the hand is connected to the third arm, to set the second joint point on a virtual travel axis passing through the origin in a horizontal plane when the robot is moved to the third joint point designated as a target position, to define, as a virtual travel axis angle, an angle formed by a reference direction passing through the origin and horizontally extending, and the virtual travel axis, to drive respective motors of axes by using the virtual travel axis angle and the target position, and to actually move the robot.

In the control method of the aspect, when the horizontal articulated robot having a redundant degree of freedom is controlled, a constraint condition that the second joint point is set on the virtual travel axis passing through the origin in the horizontal plane, the angle formed by the reference direction passing through the origin and extending horizontally, and the virtual travel axis is defined as the virtual travel axis angle, so that a posture of the robot can be uniquely determined by the virtual travel axis angle and the target position. In addition, it is possible to easily calculate the optimum virtual travel axis angle for reaching the target position with a small amount of calculation. Consequently, it is possible to move the robot to the designated target position in a short time with a small amount of calculation.

In the control method of the aspect, before the driving step is performed, optimum value calculation to calculate the optimum virtual travel axis angle corresponding to the target position can be performed. For example, once the optimum value calculation is also performed when the target position is determined by teaching, the robot can thereafter be operated optimally on the basis of the target position obtained by teaching, and the optimum virtual travel axis angle. In a case where the robot is operated by point-to-point (PTP) operation in the driving step, the optimum value calculation can be a step to calculate arrival time required to reach the target position when the robot is operated by the point-to-point operation while changing the virtual travel axis angle, and to obtain the optimum virtual travel axis angle on the basis of the virtual travel axis angle at which the arrival time is minimized. In this case, the calculation of the arrival time can be performed with a small amount of calculation, and therefore the calculation of the optimum virtual travel axis angle can be also performed with a small amount of calculation. On the other hand, in a case where the robot is performed by linear interpolation operation in the driving step, the arrival time cannot be calculated with simple calculation. Therefore, the optimum value calculation can be a step to calculate maximum velocity when the robot is operated by the linear interpolation operation to reach the target position while changing the virtual travel axis angle, and to obtain the optimum virtual travel axis angle on the basis of the virtual travel axis angle at which the maximum velocity is maximized. The calculation of the maximum velocity is easily performed for each virtual travel axis angle, and therefore, also in this case, the calculation of the optimum virtual travel axis angle can be performed with a small amount of calculation.

In the control method of the aspect, the reference direction can be determined parallel to a direction in which the plurality of stages are arranged. The reference direction is thus determined, so that transport of the workpiece between the stages can be performed while reducing a movement amount of the arm and/or the hand, and transport time can be reduced. In addition, an effective length of the first arm and an effective length of the second arm are preferably equal. The effective length of the first arm is equal to the effective length of the second arm, so that it is possible to reduce an amount of calculation for calculating the optimum virtual travel axis angle.

In the control method of the aspect, the first arm, the second arm, the third arm and the hand are folded, a posture in which the first joint point, the second joint point, and the third joint point are located on a straight line orthogonal to the reference direction passing through the origin in the horizontal plane is defined as an origin position, the origin position is defined as an initial position, and the robot is preferably sequentially moved. With such a configuration, when the target position and the virtual travel axis angle are given, even two postures for a left-handed system and a right-handed system, described below, are possible, the posture of the robot can be always uniquely determined.

A control device of an aspect of at least an embodiment of the present invention is a control device to control a horizontal articulated robot that includes a base, a first arm rotatably connected to the base, a second arm rotatably connected to the first arm, a third arm rotatably connected to the second arm, and a hand rotatably connected the third arm and holding a workpiece, and transports the workpiece between a plurality of stages, wherein a position at which the first arm is connected to the base is defined as an origin, a position at which the second arm is connected to the first arm is defined as a first joint point, a position at which the third arm is connected to the second arm is defined as a second joint point, a position at which the hand is connected to the third arm is defined as a third joint point, and when the robot is moved to the third joint point designated as a target position, the second joint point is set on a virtual travel axis passing through the origin in a horizontal plane, an angle formed by a reference direction passing through the origin and horizontally extending, and the virtual travel axis is defined as a virtual travel axis angle, and respective motors of axes are driven by using the virtual travel axis angle and the target position, and the robot is actually moved.

In the control device of the aspect, when the horizontal articulated robot having a redundant degree of freedom is controlled, a constraint condition that the second joint point is set on the virtual travel axis passing through the origin in the horizontal plane, the angle formed by the reference direction passing through the origin and extending horizontally, and the virtual travel axis is defined as the virtual travel axis angle, so that a posture of the robot can be substantially uniquely determined by the virtual travel axis angle and the target position, and the robot can be stably controlled without being influenced by the redundant degree of freedom. In addition, since it is possible to easily calculate the optimum virtual travel axis angle for reaching the target position with a small amount of calculation, it is possible to easily perform teaching or the like. Consequently, it is possible to move the robot to the designated target position in a short time with a small amount of calculation.

In the control device of the aspect, a function to obtain the virtual travel axis angle at which the arrival time is minimized, by calculating arrival time required to reach the target position while changing the virtual travel axis angle when the robot is operated by the point-to-point operation, is preferably implemented. When such a function is implemented, the arrival time can be calculated with a small amount of calculation, and therefore the calculation of the optimum virtual travel axis angle can be performed with a small amount of calculation. In the control device, a function to calculate maximum velocity at a time of reaching the target position, by operating the robot by linear interpolation operation when the virtual travel axis angle is given, is preferably implemented. When such a function is implemented, the optimum virtual travel axis angle can be obtained on the basis of the virtual travel axis angle at which the maximum velocity is maximized, and the calculation of the maximum velocity can be easily performed for each virtual travel axis angle. Therefore, also in this case, the calculation of the optimum virtual travel axis angle can be performed with a small amount of calculation.

According to at least an embodiment of the present invention, when a horizontal articulated robot having a redundant degree of freedom is controlled, it is possible to move the robot to a designated target position in a short time with a small amount of calculation.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIGS. 6A-1, 6A-2, 6B-1 and 6B-2 are graphs each illustrating change in an XY position and velocity in the PTP operation;

FIGS. 7A-1, 7A-2, 7B-1 and 7B-2 are graphs each illustrating change in a joint angle and velocity in the PTP operation;

FIGS. 8A and 8B are schematic plan views each illustrating movement of the robot in the linear interpolation operation;

FIGS. 9A-1, 9A-2, 9B-1 and 9B-2 are graphs each illustrating change in an XY position and velocity in the linear interpolation operation; and FIGS. 10A-1, 10A-2, 10B-1 and 10B-2 are graphs each illustrating change in a joint angle and velocity in the linear interpolation operation.

DETAILED DESCRIPTION

Figure 1:
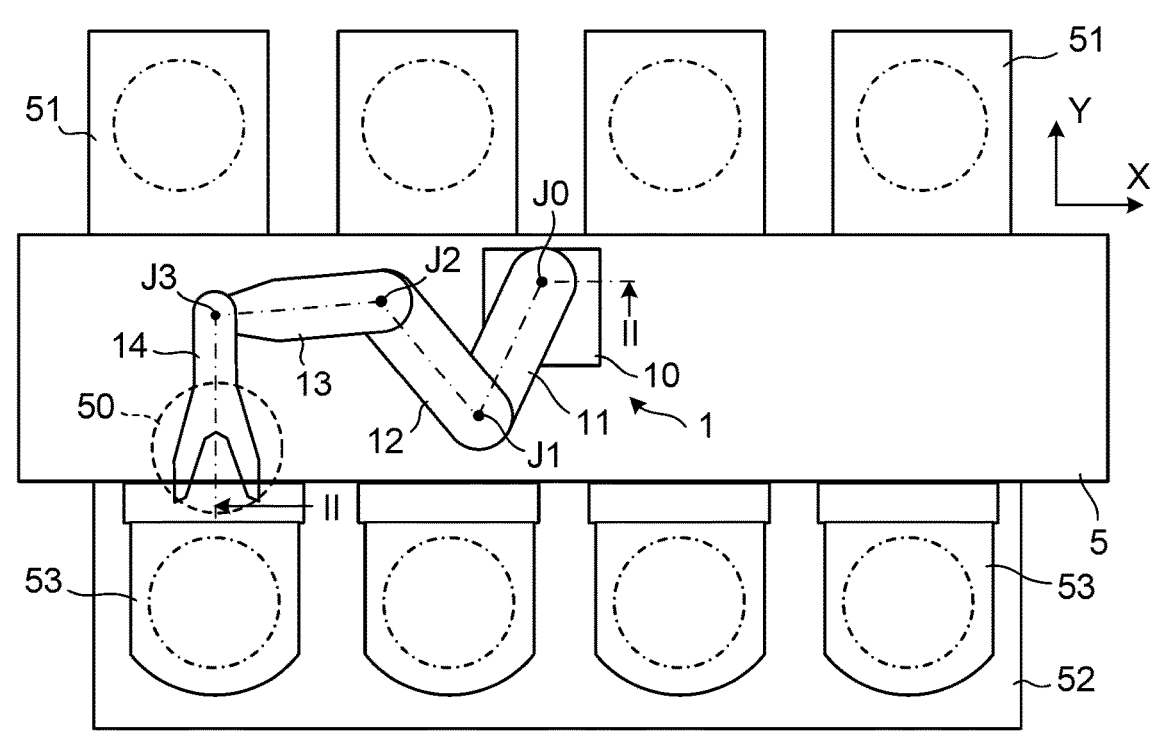
FIG. 1 is a plan view illustrating a robot.
Figure 2:
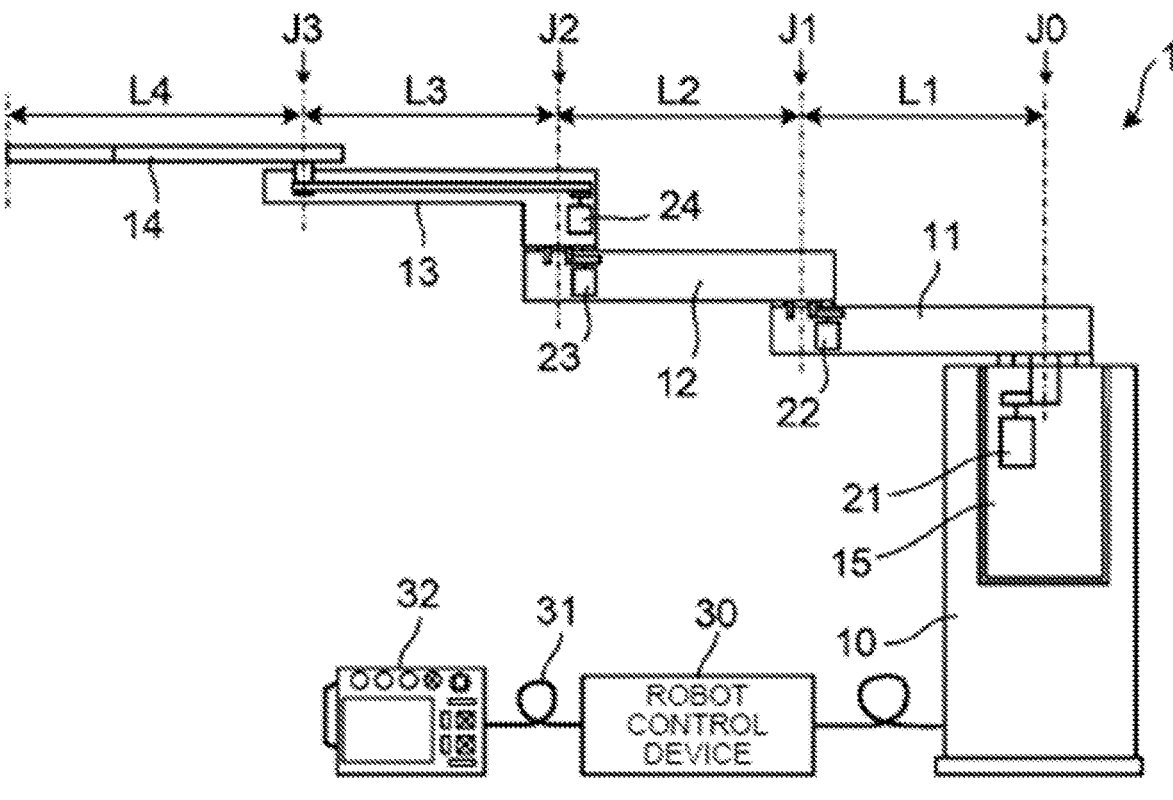
FIG. 2 is a schematic sectional view of the robot taken along the line II-II in FIG. 1.

Now, at least an embodiment of the present invention will be described with reference to the drawings. FIG. 1 is a plan view illustrating a robot to which a control method according to at least an embodiment of the present invention is applied, and FIG. 2 is a sectional view taken along the line II-II in FIG. 1. This robot 1 is a horizontal articulated robot, is disposed in a work area 5, and is used to transport, for example, a disk-shaped workpiece 50 between stages provided on a wall surface surrounding the work area 5. In the following description, the workpiece 50 is a semiconductor wafer, but the workpiece 50 is not limited to a semiconductor wafer.

The work area 5 is an elongated rectangular space, and on the wall surface along one long side of the work area 5, a plurality of cassettes 51 for accommodating wafers as the workpieces 50 are arranged along the longitudinal direction of the work area 5. A workpiece processing device 52 that performs a process on the workpiece 50 is provided on the other long side of the work area 5, and a plurality of load lock chambers 53 for transporting the workpiece 50 to and from the robot 1 are provided in the workpiece processing device 52. These load lock chambers 53 are also arranged along the longitudinal direction of the work area 5 on the wall surface that defines the work area 5. Both the cassettes 51 and the load lock chambers 53 are places where the robot 1 loads and unloads the workpiece 50, and are collectively referred to as stages as described above. The work area 5 is a space in which the robot 1 can move its hand, arm, or the like without interfering with the wall surface or the like when the workpiece 50 is transported between the stages. The cassettes 51 and the load lock chambers 53 are provided as openings formed in the wall surface of the work area 5 so as to surround the work area 5, and therefore the direction in which the robot 1 loads and unloads the workpiece 50 with respect to the stage is generally the direction perpendicular to the wall surface of the work area 5. However, depending on a structure of the stage, the workpiece 50 may be loaded/unloaded onto/from the stage in the direction inclined from the direction perpendicular to the wall surface of the work area 5.

Now, a detailed configuration of the robot 1 will be described. The robot 1 includes a base 10 disposed and fixed on a floor surface of the work area 5, three arms connected in series to the base 10, that is, a first arm 11, a second arm 12, and a third arm 13, and a hand 14 attached to the third arm 13. The base 10 includes an elevating and lowering cylinder 15 that is driven by an elevating and lowering motor (not illustrated) to elevate and lower in the vertical direction. The arms 11 to 13 and the hand 14 each have a proximal end portion and a distal end portion, and the proximal end portion of the first arm 11 is rotatably connected to the elevating and lowering cylinder 15, so that the first arm 11 is held by the base 10. The first arm 11 can elevate and lower with respect to the base 10 with elevating and lowering of the elevating and lowering cylinder 15. Although the arms 11 to 13 and the hand 14 are integrally elevated and lowered by the elevating and lowering of the elevating and lowering cylinder 15, at least an embodiment of the present invention relates to optimization of the movement of the horizontal articulated robot 1 in the horizontal plane, and the movement in the height direction by the elevating and lowering cylinder 15 is small compared to the movement of the arms 11 to 13 and the hand 14 in the horizontal plane. Therefore, in the following description, the movement of the robot 1 in the height direction by the elevating and lowering cylinder 15 is assumed to be able to be ignored.

The first arm 11 is driven by a motor 21 incorporated in the elevating and lowering cylinder 15 to rotate in the horizontal plane. The proximal end portion of the second arm 12 is rotatably connected to the distal end portion of the first arm 11, and the second arm 12 is held by the first arm 11 and is driven by a motor 22 incorporated in the first arm 11 to rotate in the horizontal plane. Similarly, the proximal end portion of the third arm 13 is rotatably held by the distal end portion of the second arm 12, and the third arm 13 is driven by a motor 23 incorporated in the second arm 12 to rotate in the horizontal plane. The proximal end portion of the hand 14 is rotatably held by the distal end portion of the third arm 13, and the hand 14 is driven by a motor 24 incorporated in the third arm 13 to rotate in the horizontal plane. The distal end portion of the hand 14 is branched into a fork shape such that the workpiece 50 can be placed thereon.

As described above, the robot 1 is a horizontal articulated robot, and the arms 11 to 13 and the hand 14 are respectively driven by the motors 21 to 24 to rotate in the horizontal plane. Therefore, in order to describe the operation of the robot 1, XY coordinates are set in the horizontal plane. The X-axis direction is the direction serving as a reference of the operation of the robot 1, and the Y-axis direction is orthogonal to the X-axis direction. In the illustrated example, the X-axis direction is the longitudinal direction of the elongated rectangular work area 5, and coincides with the direction in which the stages arranged on the wall surface surrounding the work area 5 are arranged. Further, a position of the rotation center of the first arm 11 with respect to the base 10 is defined as a joint point J0, a position of the rotation center of the second arm 12 with respect to the first arm 11 is defined as a joint point J1, the position of the rotation center of the third arm 13 with respect to the second arm 12 is defined as s a joint point J2, and a position of the rotation center of the hand 14 with respect to the third arm 13 is defined as a joint point J3. The length between the joint points J0 and J1 is defined as an effective length L1 of the first arm 11, the length between the joint points J1 and J2 is defined as an effective length L2 of the second arm 12, the length between the joint points J2 and J3 is defined as an effective length L3 of the third arm 13, and the length between the joint point J3 and the distal end of the hand 14 is defined as an effective length L4 of the hand 14. In the example illustrated herein, the effective length L1 of the first arm 11 is equal to the effective length L2 of the second arm 12.

As illustrated in FIG. 2, a robot control device 30 that controls the robot 1 is connected to the robot 1, and a pendant 32 can be connected to the robot control device 30 via a cable 31 in order to perform teaching of the robot 1. The robot control device 30 can drive and control the motors 21 to 24 and the elevating and lowering motor (not illustrated) on the basis of a command input from the outside or a command by teaching using the pendant 32.

Figure 3A:
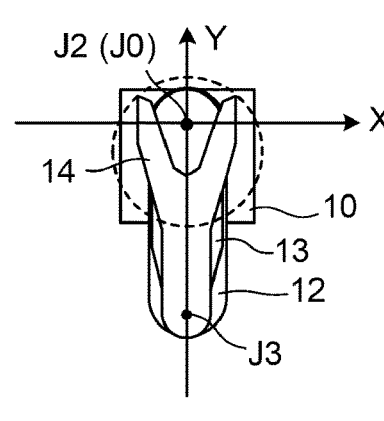
FIGS. 3A to 3F are diagrams each illustrating a posture of the robot in an XY coordinate system.

FIGS. 3A to 3F are diagrams each illustrating the posture of the robot in the XY coordinate system. A control method based on at least an embodiment of the present invention will be described with reference to FIGS. 3A to 3F. The joint point J0 (that is, the rotation center of the first arm 11 with respect to the base 10) is defined as the origin of the XY coordinate system. FIG. 3A is a plan view illustrating an origin position of the robot 1. In the robot 1, the origin position which is a posture serving as a reference of operation of the robot 1 is determined. At the origin position, the arms 11 to 13 and the hand 14 are folded, and the folded arms and hand extend in the Y-axis direction. Therefore, the joint point J2 overlaps with the joint point J0 which is the origin of the XY coordinate system, XY coordinate values of the joint point J1 are $(0, -L1)$, and XY coordinate values of the joint point J3 are $(0, -L3)$. The joint point J1 is hidden by the third arm 13 and therefore is not illustrated in the figure.

Figure 3B:
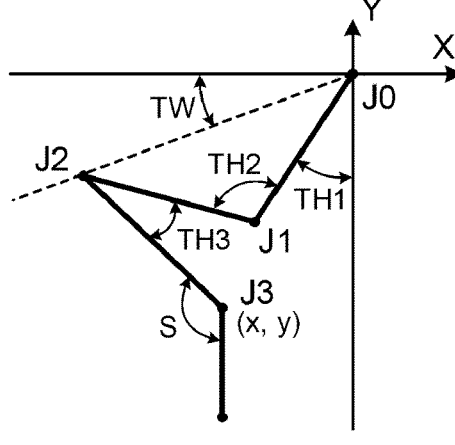

FIG. 3B illustrates a state in which the arms 11 to 13 and the hand 14 are opened in order to access the stage. The rotation angle of the first arm 11 from the origin posture around the joint point J0 is denoted by TH1. That is, the angle TH1 is a joint angle formed by the Y-axis and the first arm 11. Similarly, a joint angle formed by the first arm 11 and the second arm 12 around the joint point J1 is denoted by TH2, a joint angle formed by the second arm 12 and the third arm 13 around the joint point J2 is denoted by TH3, and a joint angle formed by the third arm 13 and the hand 14 around the joint point J3 is denoted by S. At the origin position, the angles TH1 to TH3 and S are all 0. Herein, the orientation of the hand 14 in the XY coordinate system is generally controlled to coincide with the access direction (i.e., the direction in which loading and unloading are performed) with respect to the stage to be accessed by the hand 14. Therefore, when the robot 1 is moved in the work area 5 in order to transport the workpiece 50, the XY coordinate values of the position of the joint point J3 serve as a control target, and the position of the joint point J3 at the time of completion of the movement serves as a target position. In FIG. 3B, the angle formed by the third arm 13 and the hand 14 is defined as the angle S of the hand 14, but the angle S is represented by joint coordinates.

In the robot 1, the motors 21 to 23 drive the arms 11 to 13, respectively, so that the position of the joint point J3, that is, the XY coordinate values can be changed. However, while the XY coordinate values are two dimensional values, the joint angles TH1 to TH3 can be independently changed by the motors 21 to 23, respectively, and therefore the robot 1 has only one redundant freedom degree. Assuming that the position of the joint point J3 is given as the target position, there are innumerable postures of the arms 11 to 13 for realizing the target position. Depending on the posture to which each of the arms 11 to 13 moves, a large difference may occur in the movement time, or the arms 11 to 13 or the hand 14 may interfere with surrounding objects during the movement. When a target position is given and an optimum posture at that time is obtained without a constraint condition, a large amount of calculation is required. Therefore, in this embodiment, in order to prevent the amount of calculation for control from increasing due to a redundant degree of freedom when the robot 1 is moved with the position of the joint point J3 as the target position, as virtual travel axis P which is a straight line passing through the origin is considered, and a condition that the joint point J2 which is a connection point of the second arm 12 and the third arm 13 is on the virtual travel axis P is added, and the movement of the robot 1 is controlled. The angle formed by the virtual travel axis P with respect to the X axis which is the reference direction of the robot 1 is defined as the virtual travel axis angle TW. When the positions of the virtual travel axis P and the joint point J3 are given, in other words, when the positions of the virtual travel axis angle TW and the joint point J3 are given, the postures of the arms 11 to 13 of the robot 1 are uniquely determined except for a difference between a left-handed system and a right-handed system described below. That is, the position of the joint point J3 as the target position in the XY coordinate system and the virtual travel axis angle TW at the end of the movement are given, so that the movement of the robot 1 can be controlled in one way. The robot described in Patent Document 1 corresponds to a case where the virtual travel axis P always coincides with the X axis which is the reference direction in the robot 1 according to this embodiment.

Figure 3C:
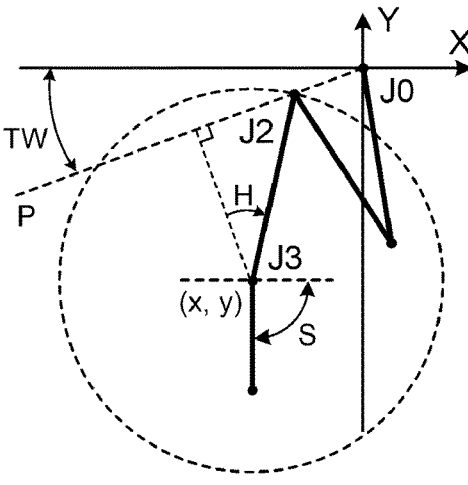
Figure 3D:
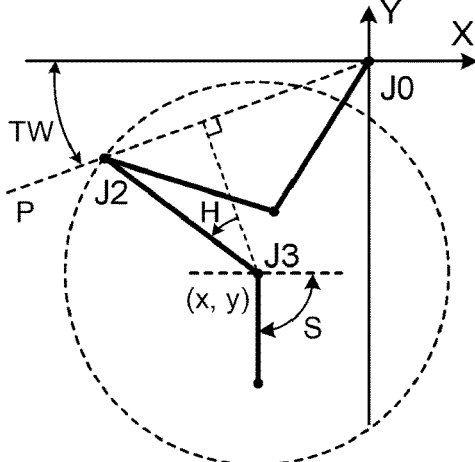

FIG. 3C and FIG. 3D are diagrams illustrating the difference between the left-handed system and the right-handed system. FIG. 3C illustrates the left-handed system and FIG. 3D illustrates the right-handed system, assuming that the positions (X, Y) of the joint points J3 are the same. The reason why the left-handed system and the right-handed system are generated is that there are generally two points at which a circle having the joint point J3 as its center and the effective length L3 of the third arm 13 as its radius intersects with the virtual travel axis P. When a perpendicular line is drawn from the joint point J3 to the virtual travel axis P and the angle H formed by this perpendicular line and the third arm 13 around the joint point J3 is measured from the perpendicular line side, in a case of H<0 (i.e., in a case where the joint point J2 is on the right side with respect to the perpendicular line), the robot is the left-handed system, and conversely, in a case where the joint point is H≥0, the robot is the right-handed system. The orientation of the hand 14 in the XY coordinate system is determined by the access direction with respect to the stage regardless of the orientation of the third arm 13, and therefore the angle formed by the positive direction of the X-axis and the hand 14 around the joint point J3 is defined as the angle S of the hand 14 in FIG. 3C and FIG. 3D. Such an angle S is represented by an orthogonal coordinate system.

Figure 3E:
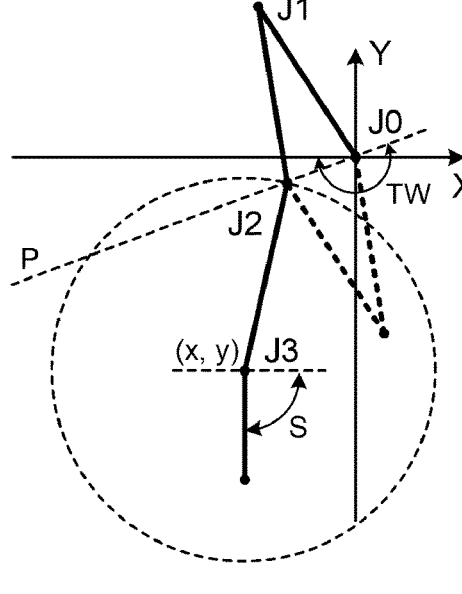
Figure 3F:
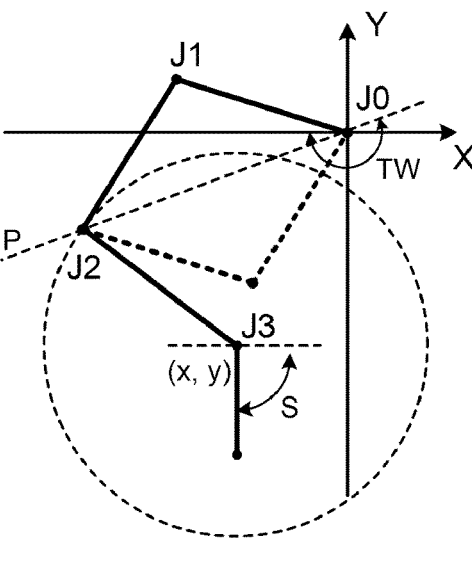

FIG. 3E illustrates a posture in which the first arm 11 and the second arm 12 in the posture illustrated in FIG. 3C are arranged at symmetrical positions with respect to the virtual travel axis P. Even in the posture illustrated in FIG. 3E, the joint point J2 is on the virtual travel axis P, but it is different whether the joint point J1 is on the right side or on the left side with respect to the virtual travel axis P when viewed from the origin toward the joint point J3. Such a difference is not classified into the difference between the left-hand system and the right-hand system, but is treated as a difference caused by the fact that the virtual travel axis angle TW formed by the X-axis direction and the virtual travel axis P is different from that illustrated in FIG. 3C by 180°. In order to express such a difference, the virtual travel axis angle TW is defined within a range of −180°<TW≤180°. Similarly, FIG. 3F illustrates a posture in which the first arm 11 and the second arm 12 are arranged at symmetrical positions with respect to the virtual travel axis P in the posture illustrated in FIG. 3D, and FIG. 3D and FIG. 3F are treated as if the virtual travel axis angle TW is different by 180°.

Consequently, in this embodiment, when the robot 1 is moved from the position before the movement to the target position, the position (X, Y) of the joint point J3 is used as the position of the robot 1, the virtual travel axis angle TW before the movement and the virtual travel axis angle TW after the movement are designated, and the motors 21 to 24 of the respective axes of the robot 1 are controlled. The virtual travel axis angle TW before the movement and the virtual travel axis angle TW after the end of the movement are generally different, and when the virtual travel axis angle TW is different before and after the movement, the virtual travel axis angle TW changes during the movement. The virtual travel axis angle TW itself after the movement needs to be set to an optimum value, but in the robot 1, the target position of the movement is sequentially determined by teaching, and every time the target position is determined by teaching, the optimum virtual travel axis angle TW corresponding to the target position can be determined. Once the target position and the optimum virtual travel axis angle TW are determined, the robot control device 30 thereafter controls the movement of the robot 1 on the basis of the target position and the optimum virtual travel axis angle TW, and the robot 1 transports the workpiece 50. Now, a method for determining the angle TW will be described.

In a case where the robot 1 is moved by the PTP operation, when the position before the movement, the target position (X, Y), and the virtual travel axis angles TW before the movement and after the movement are given, the rotation amount (movement amount) required for each of the motors 21 to 24 is calculated. Assuming that the motors 21 to 24 of respective axes start rotating at the same time and stop rotating at the same time, time required for movement can also be calculated from the allowable maximum velocity for each axis. The positions (X, Y) before and after the movement and the virtual travel axis angle TW before the movement are input, and the calculation of the movement time is repeated while the virtual travel axis angle TW after the movement is changed little by little, so that the virtual travel axis angle TW after the movement that minimizes the movement time can be obtained as the optimum condition. An algorithm for determining whether or not the arms 11 to 13 and the hand 14 interfere with another object in the PTP operation is also known, and therefore when the movement time is repeatedly obtained while the virtual travel axis angle TW after the movement is changed, it is determined whether or not the arms 11 to 13 and the hand 14 interfere with another object and whether or not the arms 11 to 13 and the hand 14 deviate from the changeable range of the joint angle determined for each axis. When it is determined that there is interference or deviation from the angle range, the virtual travel axis angle TW is excluded from the optimum condition. When a series of transport operation is actually performed by the robot 1, the origin position illustrated in FIG. 3A is given as an initial position, and the robot 1 is sequentially moved from this initial position. The joint point J0 and the joint point J2 overlap with each other at the origin position, and therefore the virtual travel axis P cannot be uniquely determined. However, in the case of the origin position, the virtual travel axis angle TW is defined as 0°. Then, when moving from the origin position to a position other than the origin position, the optimum virtual travel axis angle TW can be determined including whether the system is a right-handed system or a left-handed system. Thereafter, the position and the virtual travel axis angle TW before the movement are known, and therefore when the position of the next movement destination, that is, the next target position is given, the optimum virtual travel axis angle TW after the movement can be obtained. When the virtual travel axis angle TW after the movement is prepared as a function QTWOPT for obtaining the optimum condition by the above repetitive calculation and the function QTWOPT is implemented in the robot control device 30, the robot 1 can be optimally operated by the PTP operation by designating the positions of the joint point J3 before and after the movement by teaching.

When the robot 1 is moved by the linear interpolation operation, the angle S of the hand 14 in the orthogonal coordinate system coincides with the access direction of the stage to be accessed, and the robot 1 is controlled such that the position of the joint point J3 moves linearly along the access direction of the stage. In the case of the PTP operation, the shape of the change in the velocity of each of the motors 21 to 24 of the respective axes becomes a trapezoidal shape when the acceleration/deceleration period is included. However, in the case of the linear interpolation operation, the shape of the change in the velocity of each of the motors 21 to 24 of the respective axes does not necessarily become a trapezoidal shape, differs for each axis, and may become a complicated shape depending on the axis. Therefore, it is essential to determine whether or not the velocity of each of the motors 21 to 24 exceeds the allowable maximum velocity for each axis. In this embodiment, with respect to the linear interpolation operation, the positions before and after the movement, the virtual travel axis angles TW before and after the movement, and the acceleration time and the deceleration time (that is, acceleration/deceleration conditions) determined in common with the motors 21 to 24 are input, and the maximum velocity in the linear interpolation operation under the condition that the velocity of each of the motors 21 to 24 of the axes is within the allowable maximum velocity is calculated. Then, the virtual travel axis angle TW at which the maximum velocity of the linear interpolation operation is maximized is obtained by repeating the obtaining of the maximum velocity of the linear interpolation operation while changing the virtual travel axis angle TW after the movement little by little. The virtual travel axis angle TW thus obtained is set as an optimum value, and the virtual travel axis angle TW which is the optimum value is set as the virtual travel axis angle TW after the movement used when the robot 1 is actually operated by the linear interpolation operation. When the function for obtaining the maximum velocity of the linear interpolation operation for each virtual travel axis angle TW after movement is prepared as QCPOPT and this function QCPOPT is implemented in the robot control device 30, it is possible to obtain the virtual travel axis angle TW after movement for optimally operating the robot 1 by the linear interpolation operation by repeatedly executing this function at the time of teaching. When the robot 1 sequentially moves with the origin position as the initial position, the virtual travel axis angle TW before the movement can be set to a known value regardless of the PTP operation or the linear interpolation operation.

Figure 4:
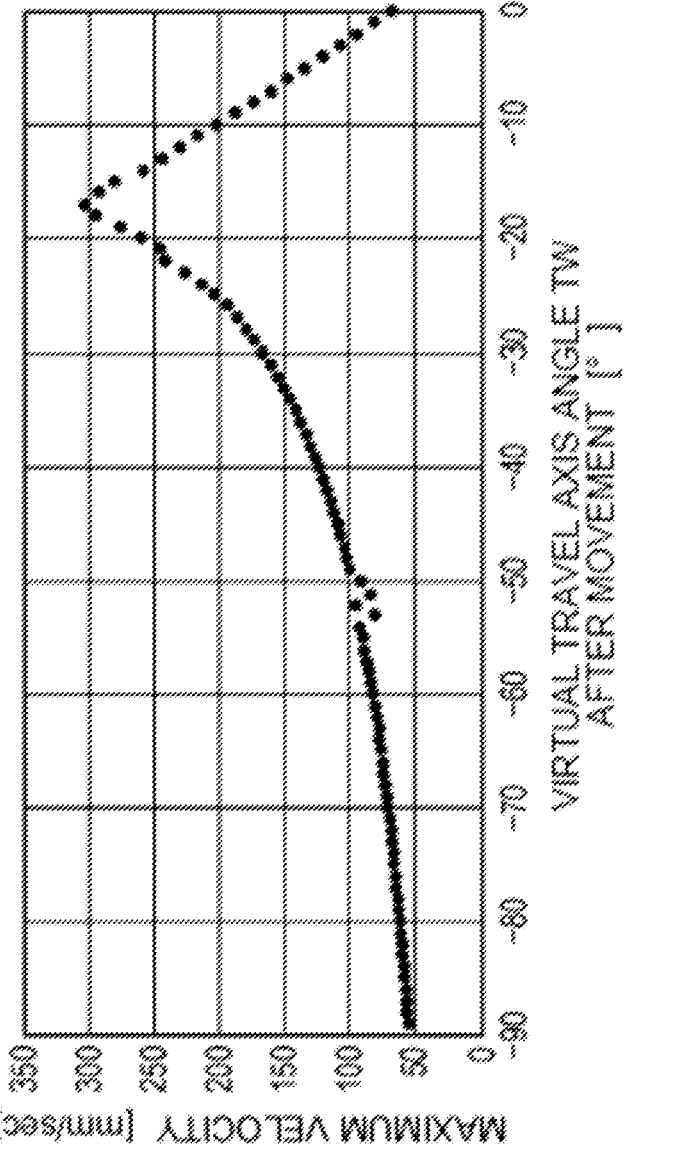
FIG. 4 is a graph illustrating a method of determining a virtual travel axis angle TW in linear interpolation operation.

FIG. 4 is a graph illustrating an example of how the value of the function QCPOPT, that is, the maximum velocity in the linear interpolation operation changes when the positions of the joint point J3 before and after the movement, the virtual travel axis angle TW before the movement, and the acceleration/deceleration condition are given and the value of the virtual travel axis angle TW after the movement is changed. Herein, assuming that the acceleration time and the deceleration time are both 0.2 sec, the position (X, Y) of the joint point J3 before the movement is (700, 0), the virtual travel axis angle TW before the movement is 0°, and the position (X, Y) of the joint point J3 after the movement is (700, −350), the calculation is performed. The maximum velocity obtained by the function QCPOPT is calculated as an approximate value, and it can be seen from the figure that the maximum velocity of the linear interpolation operation is maximized when the virtual travel axis angle TW is in the vicinity of −17°.

Figures 5A, 5B:
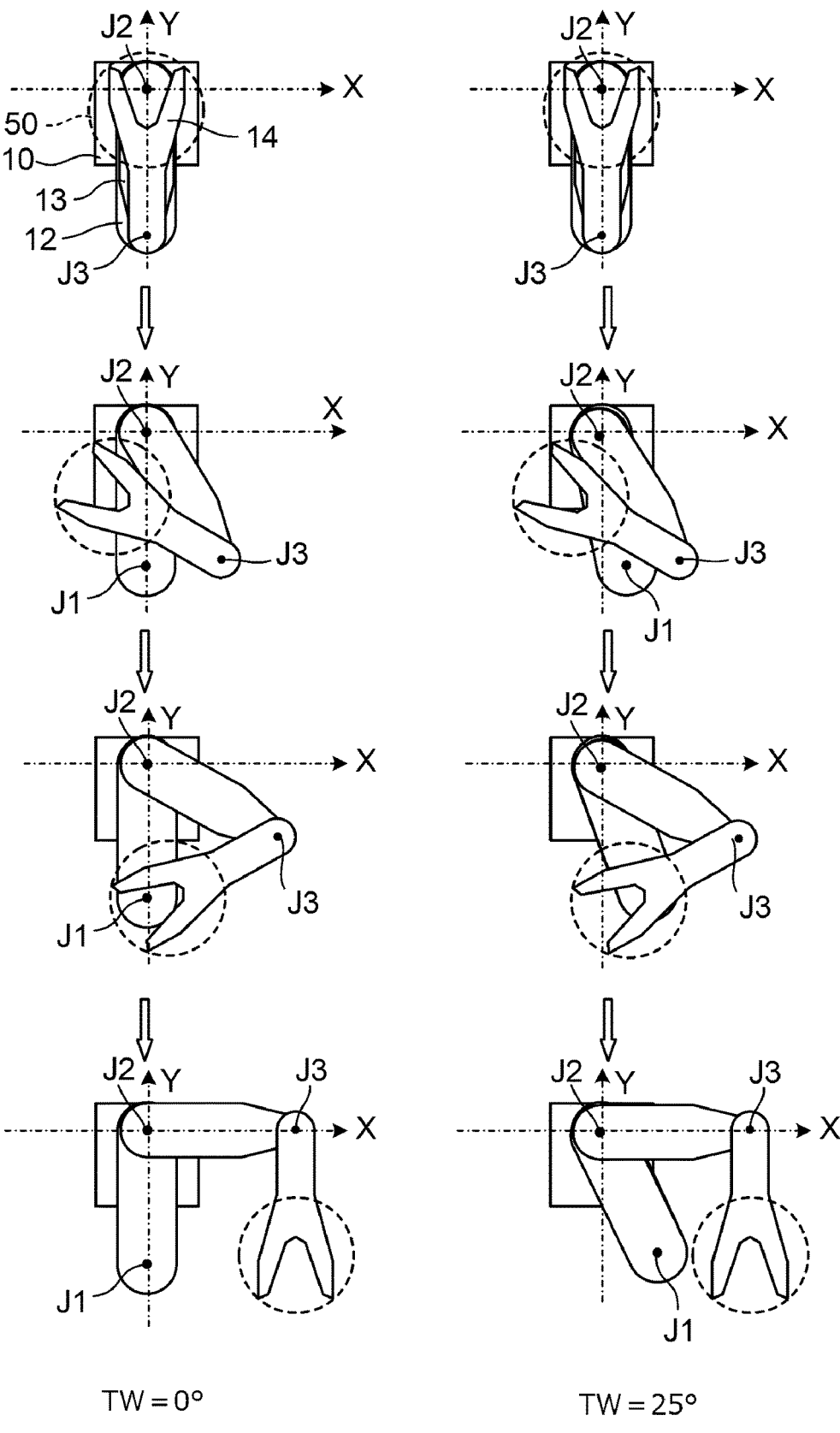
FIGS. 5A and 5B are schematic plan views each illustrating movement of the robot in PTP operation.
Figures 1, 2, 6A, 6B:
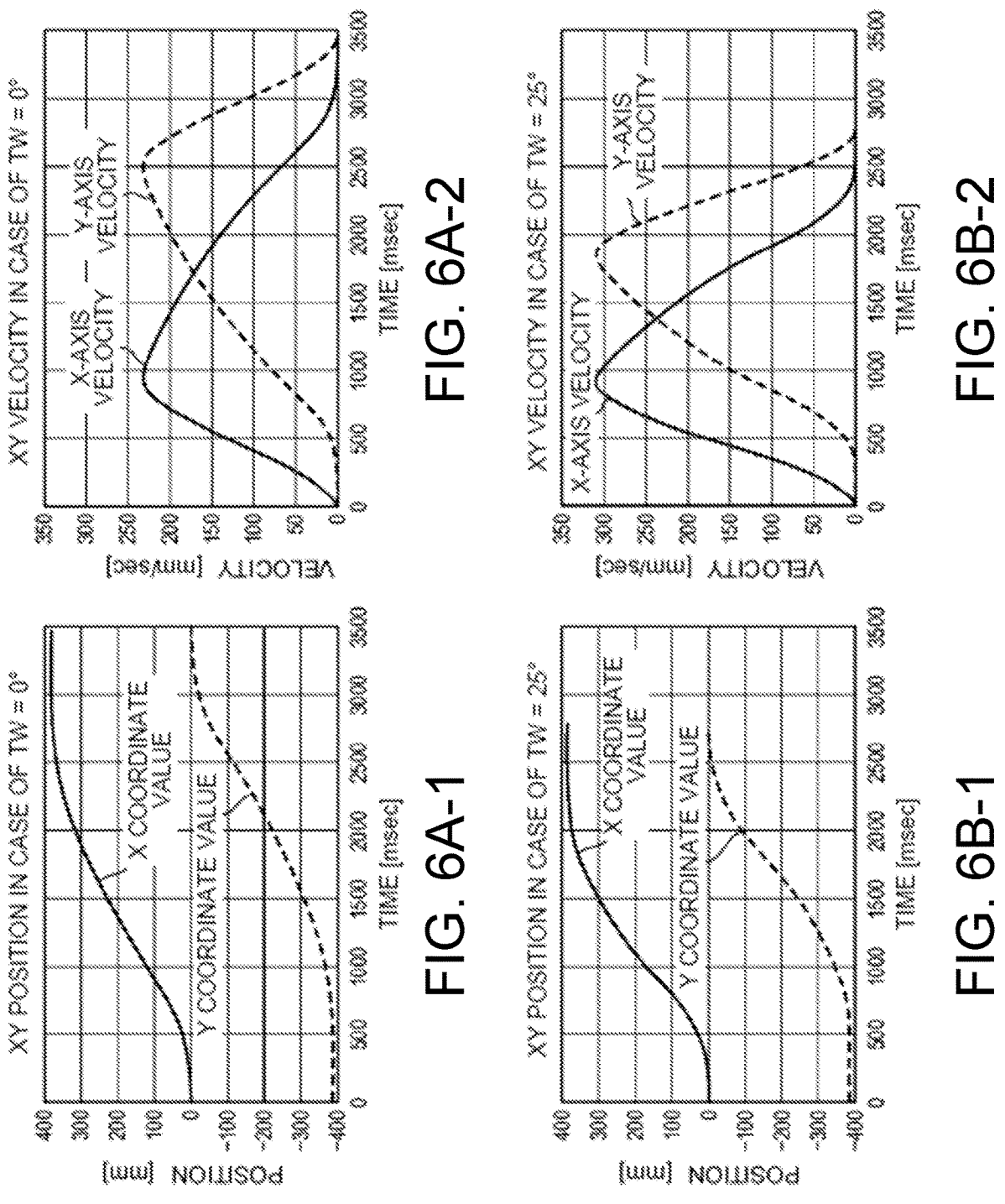
Figures 1, 2, 7A, 7B:
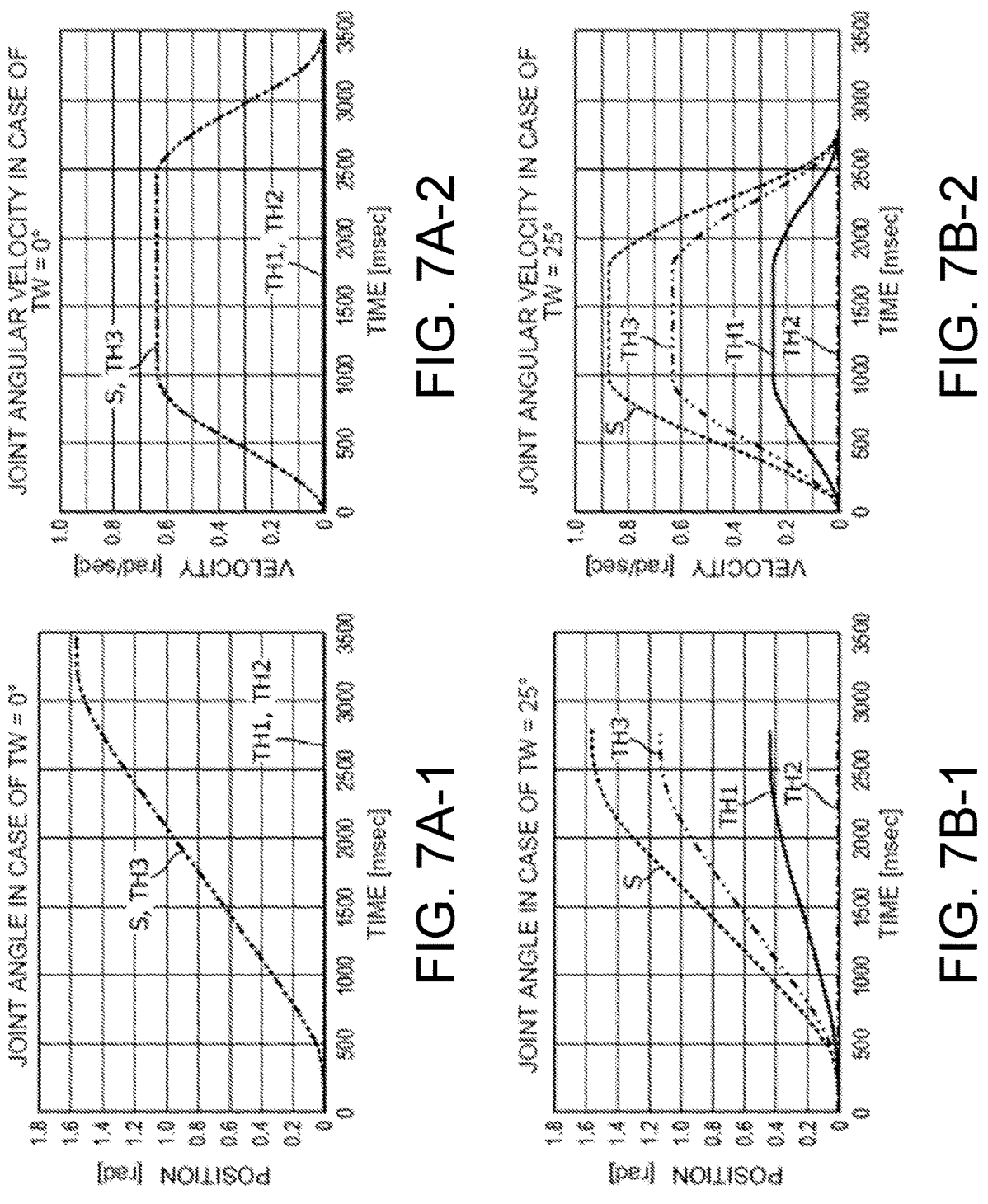
Figures 1, 2, 9A, 9B:
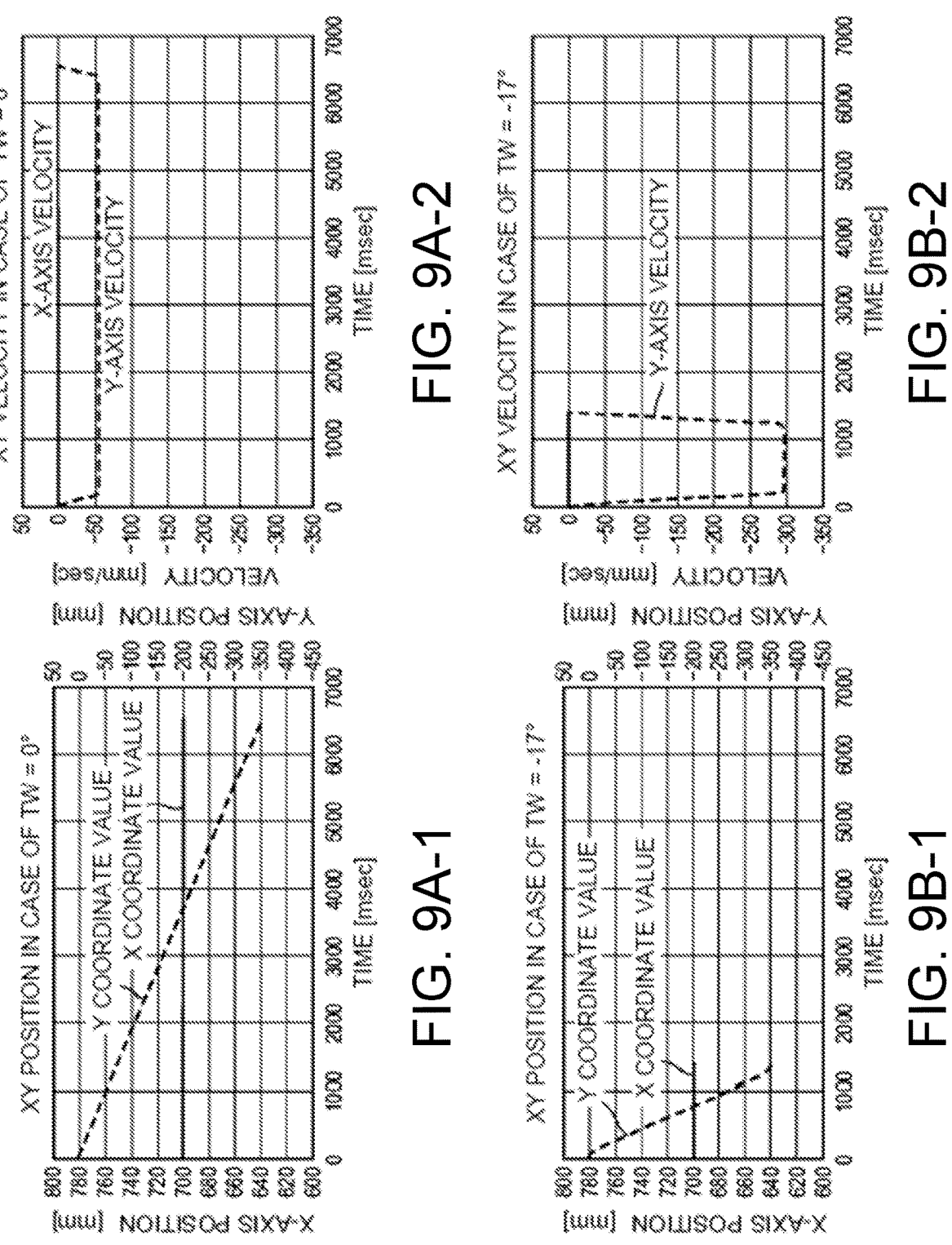
Figures 1, 2, 10A, 10B:
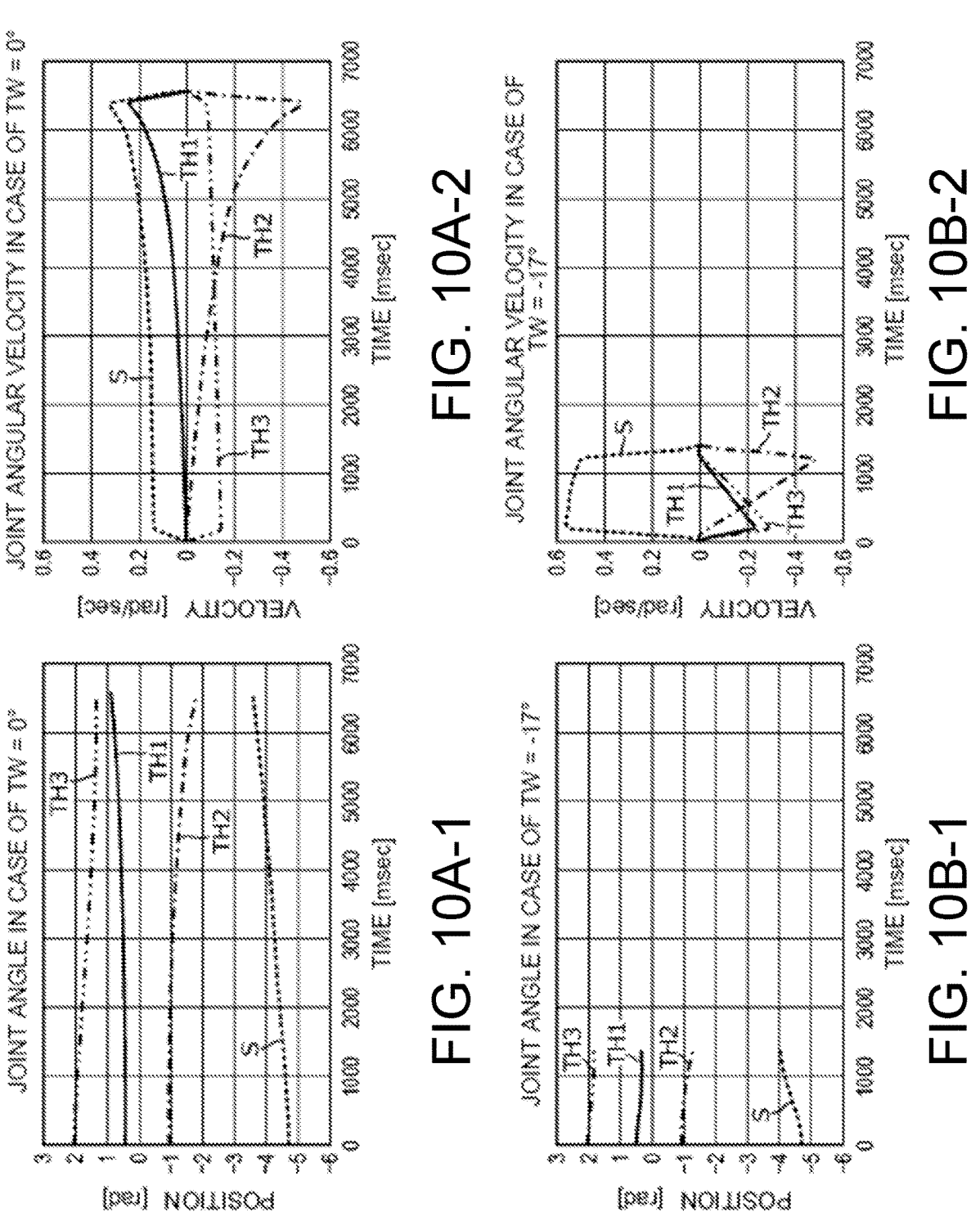

Hereinafter, an example of the operation of the robot 1 by the PTP operation and the linear interpolation operation will be described. FIGS. 5A and 5B are plan views illustrating the movements of the arms 11 to 13 and the hand 14 when the robot 1 is moved from a posture in which the position (X, Y) of the joint point J3 is (0, −385) at the origin position and the joint angle S of the hand 14 in the orthogonal coordinate system is 90° to a posture in which the position (X, Y) of the joint point J3 is (−385, 0) and the joint angle S is 270°. When this movement condition is given and the above function QTWOPT is executed, 24.93° is calculated as the optimum virtual travel axis angle TW, and the virtual travel axis angle TW used when the PTP operation is performed on the basis of this embodiment is set to 25°, considering the fact that the function QTWOPT includes a calculation error, or the like. In FIGS. 5A and 5B, FIG. 5A sequentially illustrates the movement in the PTP operation when the virtual travel axis angle TW is set to 0° (i.e., when the robot is moved in the same manner as the robot 1 of Patent Document 1), and FIG. 5B sequentially illustrates the movement in the PTP operation in a case where the virtual travel axis angle TW after the movement is set to 25° on the basis of on this embodiment. FIGS. 6A-1, 6A-2, 6B-1 and 6B-2 are graphs each illustrating change in the position (X, Y) of the joint point J3 and change in the velocity in the X-axis direction and the Y-axis direction when the robot 1 is moved as illustrated in FIG. 5A or 5B. In FIGS. 6A-1, 6A-2, 6B-1 and 6B-2, FIGS. 6A-1 and 6A-2 each illustrate change in a position and change in velocity when the virtual travel axis angle TW is set to 0° as illustrated in FIG. 5A, and FIGS. 6B-1 and 6B-2 respectively illustrate change in a position and change in velocity when the virtual travel axis angle TW is set to 25° as illustrated in FIG. 5B. FIGS. 7A-1, 7A-2, 7B-1 and 7B-2 are graphs each illustrating change in the joint angles TH1, TH2, TH3, and S and change in angular velocity of each angle when the robot 1 is moved as illustrated in FIGS. 5A and 5B. In FIGS. 7A-1, 7A-2, 7B-1 and 7B-2, FIGS. 7A-1 and 7A-2 each illustrate each joint angle and each velocity when the virtual travel axis angle TW is set to 0° as illustrated in FIG. 5A, and FIGS. 7B-1 and 7B-2 each illustrate each joint angle and each velocity when the virtual travel axis angle TW is set to 25° as illustrated in FIG. 5B.

In a case where the virtual travel axis angle TW is set to 0°, corresponding to the robot of PTL 1, in a series of movement in the PTP operation, the first arm 11 and the second arm 12 do not move, the joint point J2 also still overlaps on the joint point J0, the third arm 13 opens with respect to the second arm 12, and the hand 14 only rotates around the joint point J3. As illustrated as time until the velocity becomes 0 in FIGS. 6A-1, 6A-2, 6B-1 and 6B-2 and FIGS. 7A-1, 7A-2, 7B-1 and 7B-2, time required until the movement by the PTP operation is completed is 3460 msec. On the other hand, when the virtual travel axis angle TW after the movement was set to 25° on the basis of the control method of this embodiment, and the PTP operation was performed, the position of the joint point J2 was slightly shifted from the joint point J0, and the first arm 11 and the second arm 12 were also moved. Accordingly, the amount of movement of the third arm 13 was minimized, and the time required to complete the movement by the PTP operation was reduced to 2772 msec.

FIGS. 8A and 8B are plan views illustrating that the joint point J2 is on the X-axis before the movement (i.e., TW=0°), and illustrating the movement of the arms 11 to 13 and the hand 14 when the robot 1 is moved from the posture in which the position (X, Y) of the joint point J3 is (700, 0) and the joint angle S of the hand 14 in the orthogonal coordinate system is –90° to the posture in which the position (X, Y) of the joint point J3 is (700, –350) by the linear interpolation operation.

There is no change in the joint angle S of the hand 14. The condition of this movement is the same as the case described with reference to FIG. 4, and therefore the optimum virtual travel axis angle TW obtained by repeatedly executing the function QCPOPT is –17° as described above. Therefore, the virtual travel axis angle TW after the movement used when the linear interpolation operation is performed is set to –17°. In FIGS. 8A and 8B, FIG. 8A sequentially illustrates the movement in the linear interpolation operation when the virtual travel axis angle TW is set to 0° (i.e., when the robot is moved in the same manner as the robot 1 of Patent Document 1), and FIG. 8B sequentially illustrates the movement in the linear interpolation operation in a case where the virtual travel axis angle TW after the movement is set to –17° on the basis of this embodiment. FIGS. 9A-1, 9A-2, 9B-1 and 9B-2 are graphs each illustrating change in the position (X, Y) of the joint point J3 and change in the velocity in the X-axis direction and the Y-axis direction when the robot 1 is moved as illustrated in FIG. 8A. In FIGS. 9A-1, 9A-2, 9B-1 and 9B-2, FIGS. 9A-1 and 9A-2 each illustrate the position and the velocity when the virtual travel axis angle TW is set to 0° as illustrated in FIG. 8A, and FIGS. 9B-1 and 9B-2 each illustrate each position and each velocity when the virtual travel axis angle TW is set to –17° as illustrated in FIG. 8B. FIGS. 10A-1, 10A-2, 10B-1 and 10B-2 are graphs illustrating change in each of the joint angles TH1, TH2, TH3, and S and change in the velocity of each angle when the robot 1 is moved as illustrated in FIGS. 8A and 8B. In FIGS. 10A-1, 10A-2, 10B-1 and 10B-2, FIGS. 10A-1 and 10A-2 each illustrate each joint angle and each velocity when the virtual travel axis angle TW is set to 0°, and FIGS. 10B-1 and 10B-2 each illustrate each joint angle and each velocity when the virtual travel axis angle TW is set to –17°.

When the virtual travel axis angle TW is fixed to 0°, corresponding to the robot of PTL 1, the joint point J2 only moves on the X-axis. As illustrated as time until the velocity becomes 0 in FIGS. 9A-1, 9A-2, 9B-1 and 9B-2 and FIGS. 10A-1, 10A-2, 10B-1 and 10B-2, time required until the movement by the linear interpolation operation is completed is 6552 msec. On the other hand, when the virtual travel axis angle TW after the movement was set to –17° on the basis of the control method of this embodiment, and the linear interpolation operation was performed, the position of the joint point J2 was moved in the –Y direction with the change of the virtual travel axis P. Accordingly, the amount of rotation of the third arm 13 with respect to the second arm 12 was reduced, the overall operation velocity was increased, and the time required to complete the movement by the linear interpolation operation was greatly reduced to 1384 msec.

As described above, in this embodiment, the virtual travel axis P passing through the joint point J0 and the joint point J2 is assumed, the angle formed by the virtual travel axis P and the X-axis direction as the reference direction is defined as the virtual travel axis angle TW, the optimum value of the virtual travel axis angle TW after the movement is obtained, and the motors of the respective axes are driven so as to realize the position after the movement (that is, the target position) and the virtual travel axis angle TW as the optimum value. Consequently, in this embodiment, when the robot 1 is moved to the target position, the robot 1 can be moved to the target position in a short time with a small amount of calculation as a whole including the amount of calculation required to calculate the optimum virtual travel axis angle TW.

What is claimed is:

1. A control method to control a horizontal articulated robot that transports a workpiece between a plurality of stages, the robot comprising a base, a first arm rotatably connected to the base, a second arm rotatably connected to the first arm, a third arm rotatably connected to the second arm, and a hand rotatably connected the third arm and holding the workpiece, the control method comprising
a driving step which comprising
defining, as an origin, a position at which the first arm is connected to the base,
defining, as a first joint point, a position at which the second arm is connected to the first arm, to define, as a second joint point, a position at which the third arm is connected to the second arm,
defining, as a third joint point, a position at which the hand is connected to the third arm,
setting the second joint point on a virtual travel axis passing through the origin in a horizontal plane when the robot is moved to the third joint point designated as a target position,
defining, as a virtual travel axis angle, an angle formed by a reference direction passing through the origin and horizontally extending and the virtual travel axis,
driving respective motors of axes by using the virtual travel axis angle and the target position, and to actually move the robot.

2. The control method according to claim 1, wherein before the driving step is performed, optimum value calculation to calculate an optimal one of the virtual travel axis angle corresponding to the target position is performed.

3. The control method according to claim 2, wherein the robot is operated by point-to-point operation in the driving step, and
the optimum value calculation is to calculate arrival time required to reach the target position when the robot is operated by the point-to-point operation while changing the virtual travel axis angle, and to obtain the optimum virtual travel axis angle on the basis of the virtual travel axis angle at which the arrival time is minimized.

4. The control method according to claim 2, wherein the robot is operated by linear interpolation operation in the driving step, and
the optimum value calculation is to calculate maximum velocity when the robot is operated by the linear interpolation operation to reach the target position while changing the virtual travel axis angle, and to obtain the optimum virtual travel axis angle on the basis of the virtual travel axis angle at which the maximum velocity is maximized.

5. The control method according to claim 1, wherein the reference direction is determined parallel to a direction in which the plurality of stages are arranged.

6. The control method according to claim 2, wherein the reference direction is determined parallel to a direction in which the plurality of stages are arranged.

7. The control method according to claim 3, wherein the reference direction is determined parallel to a direction in which the plurality of stages are arranged.

8. The control method according to claim 4, wherein the reference direction is determined parallel to a direction in which the plurality of stages are arranged.

9. The control method according to claim 1, wherein an effective length of the first arm is equal to an effective length of the second arm.

10. The control method according to claim 2, wherein an effective length of the first arm is equal to an effective length of the second arm.

11. The control method according to claim 3, wherein an effective length of the first arm is equal to an effective length of the second arm.

12. The control method according to claim 4, wherein an effective length of the first arm is equal to an effective length of the second arm.

13. The control method according to claim 1, wherein the first arm, the second arm, the third arm and the hand are folded, a posture in which the first joint point, the second joint point, and the third joint point are located on a straight line orthogonal to the reference direction passing through the origin in the horizontal plane is defined as an origin position, the origin position is defined as an initial position, and the robot is sequentially moved.

14. The control method according to claim 2, wherein the first arm, the second arm, the third arm and the hand are folded, a posture in which the first joint point, the second joint point, and the third joint point are located on a straight line orthogonal to the reference direction passing through the origin in the horizontal plane is defined as an origin position, the origin position is defined as an initial position, and the robot is sequentially moved.

15. The control method according to claim 3, wherein the first arm, the second arm, the third arm and the hand are folded, a posture in which the first joint point, the second joint point, and the third joint point are located on a straight line orthogonal to the reference direction passing through the origin in the horizontal plane is defined as an origin position, the origin position is defined as an initial position, and the robot is sequentially moved.

16

16. The control method according to claim 4, wherein the first arm, the second arm, the third arm and the hand are folded, a posture in which the first joint point, the second joint point, and the third joint point are located on a straight line orthogonal to the reference direction passing through the origin in the horizontal plane is defined as an origin position, the origin position is defined as an initial position, and the robot is sequentially moved.

17. A control device to control a horizontal articulated robot that comprises a base, a first arm rotatably connected to the base, a second arm rotatably connected to the first arm, a third arm rotatably connected to the second arm, and a hand rotatably connected the third arm and holding a workpiece, and transports the workpiece between a plurality of stages, wherein a position at which the first arm is connected to the base is defined as an origin, a position at which the second arm is connected to the first arm is defined as a first joint point, a position at which the third arm is connected to the second arm is defined as a second joint point, a position at which the hand is connected to the third arm is defined as a third joint point, and when the robot is moved to the third joint point designated as a target position, the second joint point is set on a virtual travel axis passing through the origin in a horizontal plane, an angle formed by a reference direction passing through the origin and horizontally extending and the virtual travel axis is defined as a virtual travel axis angle, and each motor of each axis is driven by using the virtual travel axis angle and the target position to make the robot actually moved.

18. The control device according to claim 17, wherein a function, to obtain the virtual travel axis angle at which the arrival time is minimized, by calculating arrival time required to reach the target position while changing the virtual travel axis angle when the robot is operated by the point-to-point operation, is implemented.

19. The control device according to claim 17, wherein a function, to calculate maximum velocity at a time of reaching the target position, by operating the robot by linear interpolation operation when the virtual travel axis angle is given, is implemented.

\* \* \* \* \*